(12) United States Patent
Johnston

(10) Patent No.: US 6,729,624 B1
(45) Date of Patent: May 4, 2004

(54) RADIAL SHAFT SEAL

(75) Inventor: David E. Johnston, East Hebron, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/789,096

(22) Filed: Feb. 20, 2001

(51) Int. Cl.$^7$ ................................. F16J 15/32
(52) U.S. Cl. .................. 277/560; 277/559; 277/351
(58) Field of Search ...................... 277/559–569, 277/551, 549, 351

(56) References Cited

U.S. PATENT DOCUMENTS

| | | | | |
|---|---|---|---|---|
| 4,274,641 A | * | 6/1981 | Cather, Jr. ................... | 277/309 |
| 4,288,083 A | * | 9/1981 | Braconier .................... | 277/559 |
| 4,553,760 A | * | 11/1985 | Reed et al. .................. | 277/503 |
| 4,613,143 A | * | 9/1986 | Butler ......................... | 277/569 |
| 4,867,926 A | * | 9/1989 | Matsushima ................. | 264/154 |
| 4,986,553 A | * | 1/1991 | Preston et al. ............... | 277/559 |
| 5,183,271 A | * | 2/1993 | Wada et al. .................. | 277/351 |
| 5,511,886 A | * | 4/1996 | Sink ............................. | 384/486 |
| 5,915,696 A | * | 6/1999 | Onuma et al. ............... | 277/559 |
| 6,050,570 A | * | 4/2000 | Otto ............................. | 277/351 |
| 6,213,476 B1 | * | 4/2001 | Chandler et al. ............ | 277/569 |

FOREIGN PATENT DOCUMENTS

| | | | | |
|---|---|---|---|---|
| DE | 4305891 A1 | * | 9/1994 | ............ F16J/15/32 |
| EP | 353913 A | * | 2/1990 | ............ F16J/15/32 |
| GB | 2240592 A1 | * | 7/1991 | ............ F16J/15/32 |
| GB | 2240592 A | * | 8/1991 | ............ F16J/15/32 |

* cited by examiner

*Primary Examiner*—Anthony Knight
*Assistant Examiner*—Christopher J. Boswell
(74) *Attorney, Agent, or Firm*—Ronald W. Wangeraw; Casimir R. Kiczek; Donald A. Wilkinson

(57) ABSTRACT

A radial shaft seal for dynamic applications is disclosed. The shaft seal has a case member and a resilient sealing body attached to the case member. The sealing body includes an annular elastomeric member and a resinous ring. The elastomeric member has a radially extending section and a distal end. The resinous ring has a radially extending portion and an edge. The radially extending section is contiguous to the radially extending portion to form a composite seal lip body. The composite seal lip body, as installed, is positioned so that the distal end of the radially extending section and the edge of said radially extending portion engage the shaft in fluid tight relation by the elastomeric member and by the reaction forces of the resinous ring. Therefore, a portion of the reaction forces is shared by the edge and the distal end so as to reduce the wear in the distal end. The seal may optionally have one of several pumping features including uni-directional helical ribs, bi-directional helical ribs, uni-directional keel-shaped helical ribs, bi-directional keel shaped helical ribs and undulating pumping members.

7 Claims, 6 Drawing Sheets

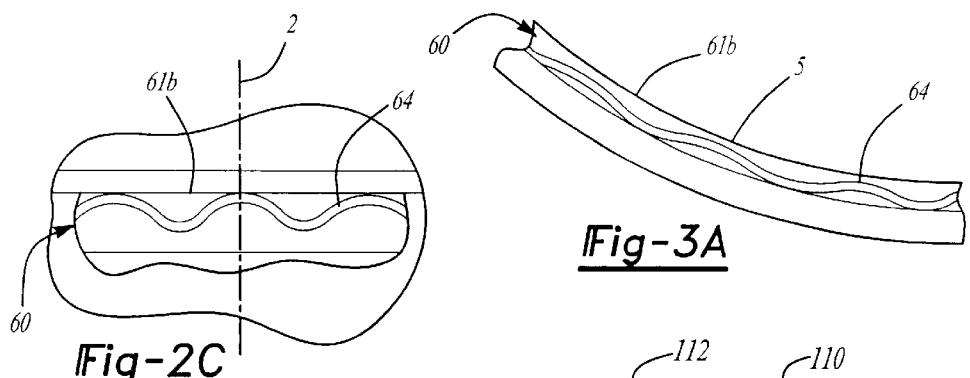
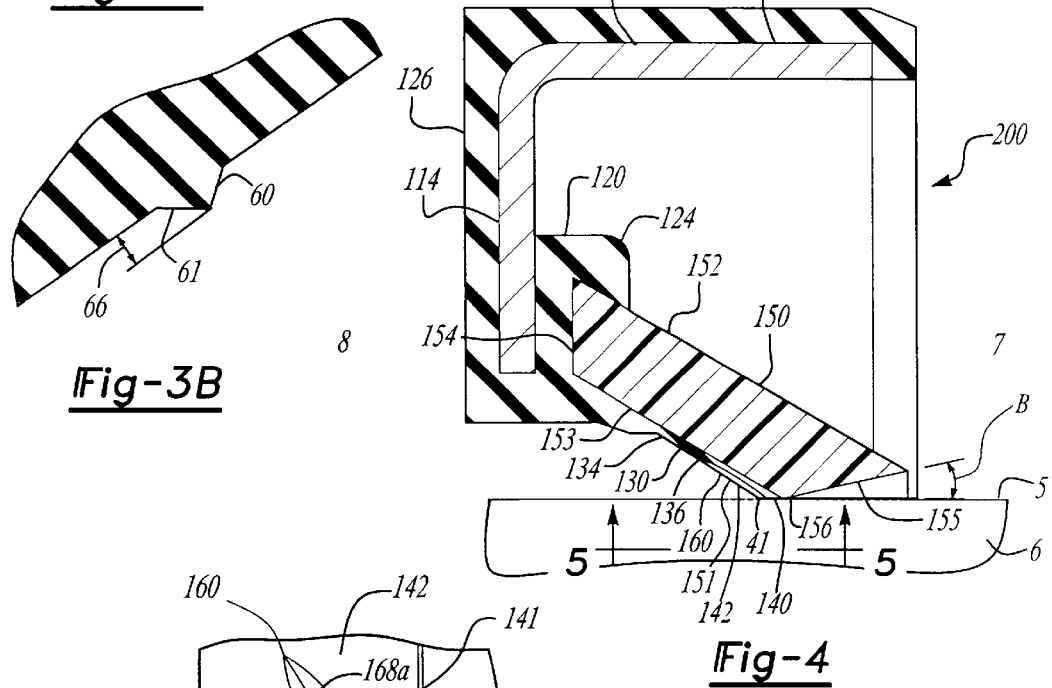
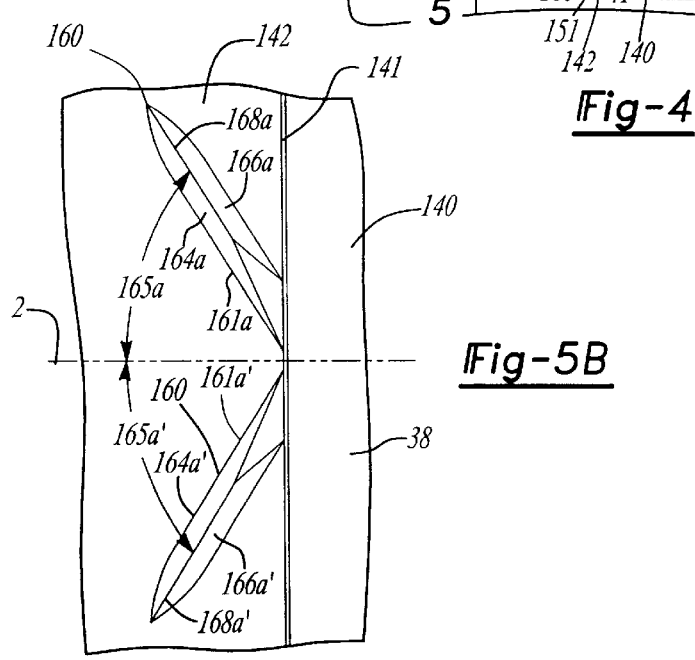

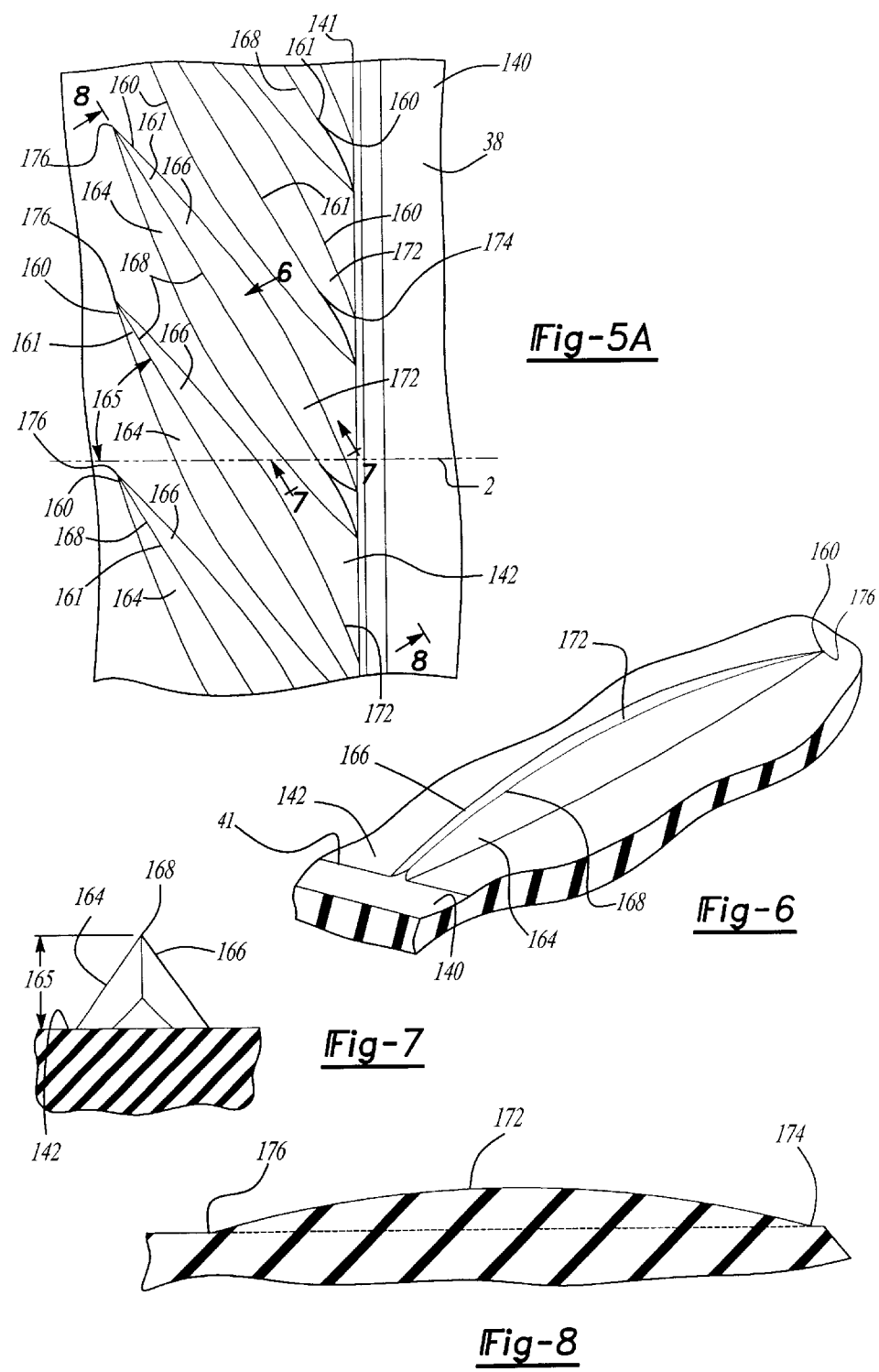

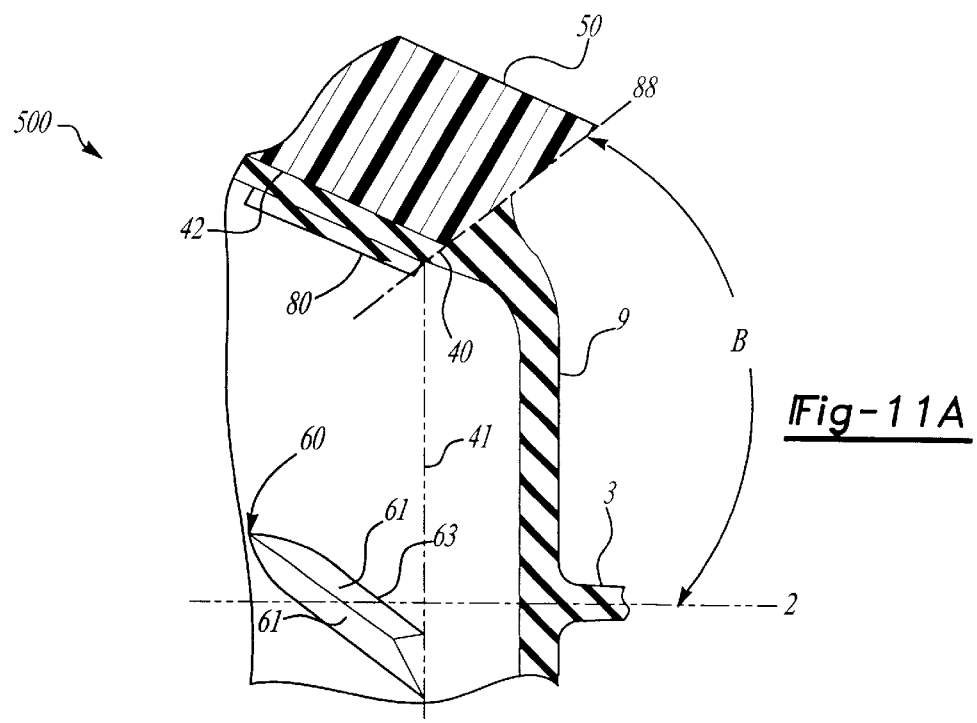
*Fig-11A*
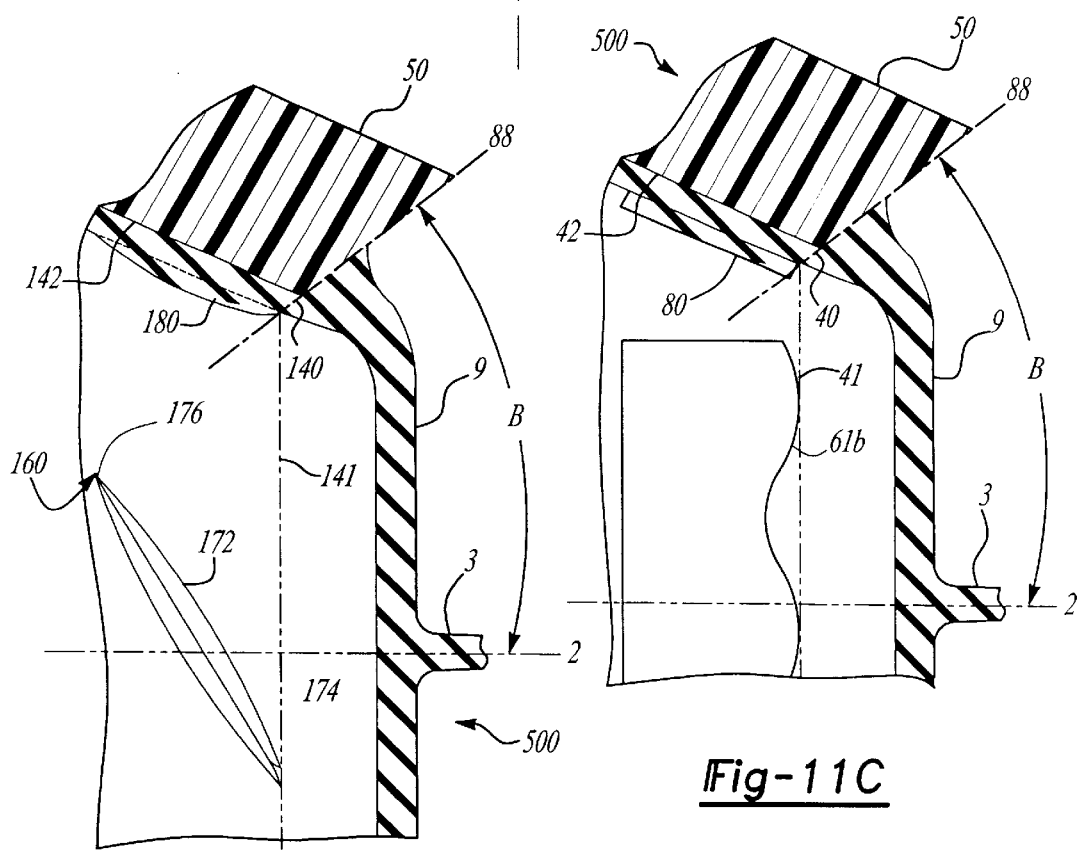
*Fig-11B*
*Fig-11C*

RADIAL SHAFT SEAL

BACKGROUND OF THE INVENTION

The present invention relates generally to fluid seals, and more particularly, to radial shaft seals with an elastomeric portion and a resinous ring portion.

Shaft seals incorporating resinous sealing rings are known in the prior art. Examples of these are found in U.S. Pat. Nos. 5,791,658 and 5,921,555 which are owned by the assignee of the current application. Resinous sealing rings made of polymers such as polytetrafluoroethylene (PTFE), or the like, are characterized by a very lubricious surface that has several advantages. For example, they resist rapid wear, are relatively chemically inert and perform well in relatively dry environments, such as those where all or part of the seal is not immersed in oil.

However, a resinous sealing material has its limitations. As the resinous sealing material becomes less flexible, it loses its ability to follow the shape of the shaft surface which it sealing and it is also subject to cold flow or creep.

On the other hand, elastomeric materials have been used for sealing applications for nearly seventy years. Elastomeric seals are used in sealing applications because they are relatively rugged, resilient, can be designed for a snug fit over an associated shaft and they retain elasticity over a long period of time. However, elastomeric seals also have limitations, such as limited chemical resistance, and they do not perform well in relatively dry environments.

Thus, there is a need to combine elastomeric materials and resinous materials into one composite shaft seal that optimizes the attributes of each material while reducing the disadvantages of these materials. One example of his is U.S. Pat. No. 4,986,553 where a thin layer of elastomeric material covers and is bonded to the surface of a flexible PTFE ring component. In use, the PTFE ring component presses down on a substantial width of the elastomeric sealing surface until the sealing surface wears away with time against the radial shaft. Thus, the PTFE ring component and the layer of elastomeric material both contact the radial shaft in order to prevent the migration of fluid past the sealing band of the composite seal. However, it has been found that the wear performance of this seal is not satisfactory. This is because the major portion of the initial contact load on the seal is carried by the elastomeric sealing surface, there is a tendency for the elastomeric portion to shred into pieces and these shredded pieces may wedge into and damage the seal contact surface with the radial shaft surface.

Thus, none of the known prior art designs utilizes a composite seal against the radial shaft in which the elastomeric section provides the major static and dynamic sealing functions and in which the resinous portion carries a major portion of the contact load so that after initial wear in, the contact load at the edge of the composite seal is carried by the resinous portion and the sealing function is accomplished by the elastomeric section.

SUMMARY OF THE INVENTION

The present invention seeks to provide a solution to the above problems and provide a composite shaft seal in which the elastomeric section at its distal end provides a static seal and the pumping action for dynamic sealing against the radial shaft and in which the distal end of the resinous portion provides chemical and wear resistance and low friction and carries a majority of the contact load support for the sealing lip. In pressurized applications, the resinous portion provides stiffness to the elastomeric section to limit distortion of the elastomeric section and to prevent a substantial increase in contact load on the sealing lip due to pressure acting on the resinous portion of the elastomeric member with the shaft.

The present invention discloses a composite shaft seal adapted for sealing against a dynamic shaft. The shaft seal includes a case member and a resilient sealing body attached to the case member. The sealing body has an annular elastomeric member and a resinous ring. The elastomeric member has a radially extending section and a distal end portion. The resinous ring has a radially extending portion and a radial contact edge. The radially extending section is contiguous to the radially extending portion having a sealing edge. The sealing edge is biased to form an interference fit with the distal end portion of the shaft for dynamic and static sealing and the radial contact edge supports a major portion of the radial reaction forces of the resinous ring so as to engage the shaft in fluid tight relation and to reduce wear on the distal end portion.

It is an object of the present invention to provide a composite seal in which the distal edge of the elastomeric member provides both static sealing and dynamic sealing against the shaft and in which the edge of the resinous portion provides chemical and wear resistance and low friction and absorbs a major portion of the contact support load for the distal edge of the elastomeric member.

It is another object of the present invention to provide a composite shaft seal for pressurized applications in which the resinous ring provides stiffness to the elastomeric member to prevent distortion to the elastomeric member and to reduce the amount of contact load the elastomeric member must absorb when contacting the shaft.

These and other objects and features of the present invention will become apparent from the description and especially taken in conjunction with the accompanying drawings illustrating the invention and the preferred embodiment.

BRIEF DESCRIPTION OF THE DRAWINGS

The various advantages of the present invention will become apparent to one skilled in the art upon reading the following specification and by reference to the drawings which include:

FIG. 2C is an enlarged fragmentary view of undulating members in a plane indicated by the line 2—2 in FIG. 1;

FIG. 3A is a partial cross-sectional view of an undulating member as viewed from the air side of the shaft seal along the surface of the shaft toward the oil side;

FIG. 3B is a cross-sectional view of a helical rib taken substantially along the line 3—3 in FIG. 2B and line 3—3 in FIG. 2A;

FIG. 4 is a cross-sectional view of another embodiment of the shaft seal according to the present invention;

FIG. 5A is an enlarged fragmentary view taken generally in a plane indicated by the line 5—5 of FIG. 4 of a unidirectional helix bar pumping element;

FIG. 5B is an enlarged fragmentary view taken generally in a plane indicated by the line 5—5 of FIG. 4 of a bi-directional helix bar pumping element;

FIG. 6 is a perspective view along a helical pumping rib as viewed in the direction of the arrow 6 in FIG. 5A;

FIG. 7 is a cross-sectional view taken along the line 7—7 of FIG. 5A;

FIG. 8 is a cross-sectional view taken along the line 8—8 of FIG. 5A;

FIG. 11A is a schematic cross-sectional view showing a part of the semi-finished oil seal trimmed with only one helical pumping rib to simplify the drawing;

FIG. 11B is a schematic cross-sectional view showing a part of the semi-finished seal with another helix bar pumping element to simplify the drawing;

FIG. 11C is a schematic cross-sectional view showing a part of the semi-finished seal with an undulating pumping feature;

DETAILED DESCRIPTION OF THE PREFERRED EMBODIMENTS

Figure 1:
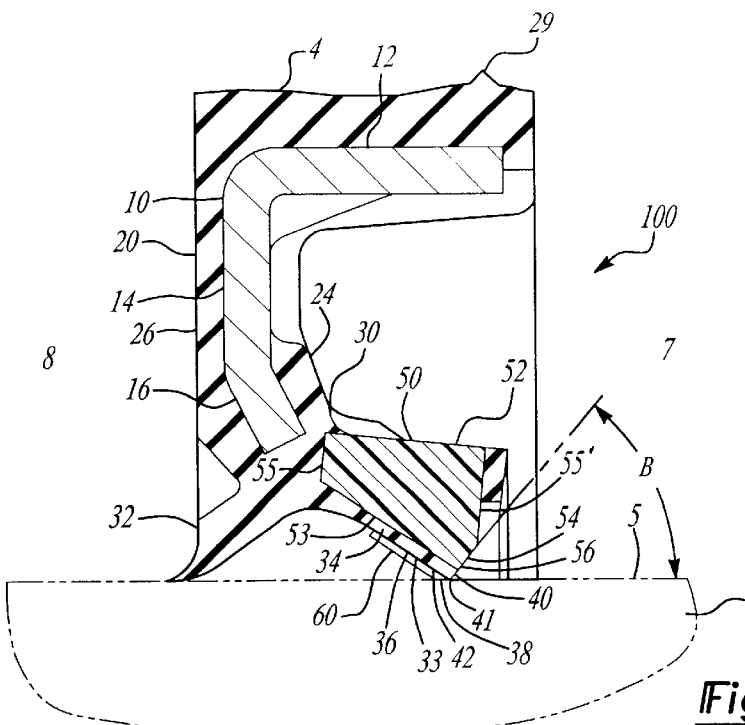
FIG. 1 is a cross-sectional view of a shaft seal according to one embodiment of the present invention.

The shaft seal according to the invention is one where the contact surface on the shaft is disposed radially inwardly of the resilient body. However, it will be understood that the invention applies equally to seals where the parts are reversed, that is, the contact surface is on an axially extending portion of a companion flange or unitizing element which is disposed radially outwardly of the resilient body. Additionally, the present invention can be used in dynamic sealing applications which include both rotary shaft and reciprocating shaft applications.

It will also be understood that various elastomers are useful in making the shaft seal according to the invention, such as the following polymeric materials: nitrile, (NBR), hydrogenated nitrile (HNBR), polyacrylate (ACM), ethylene acrylate (AEM), fluorocarbon (FKM), silicone (VMQ), fluorosilicone (FVMQ), epichlorohydrin (ECO), fluoropolymers, thermoplastic elastomers (TPE), and thermoplastic vulcanizates (TPV). Additionally, resinous materials, such as, polytetrafluoroethylene (PTFE) or other lubricious fluorocarbon materials, such as, for example Delrin®, may be used in practicing the invention. Delrin® is a registered trademark of DuPont Corporation of Wilmington, Del.

The present invention is not intended to be limited to the use of any particular material, except insofar as such material would not be suitable for use in a fluid seal of the type comprehended by the invention.

The invention contemplates and discloses several preferred seal embodiments. Each specific seal is designed to operate at a different pressure environment in the sealed region. The first seal embodiment, designated by the numeral 100, is designed to operate in a pressure environment of up to 0.2 Mpa; the second seal embodiment, designated by the numeral 200, is designed to operate in a pressure environment of up to 0.3 Mpa; the third seal embodiment, designated by the numeral 300, is designed to operate in a pressure environment of up to 0.1 Mpa; and the fourth seal embodiment, designated by the numeral 400, is designed to operate in a pressure environment of up top 0.5 Mpa. Each of these preferred seal embodiments will now be discussed in detail.

The first embodiment of the present invention is directed to a radial shaft seal for use in sealing dynamic applications and as adapted for pressure applications up to 0.2 MPa. This embodiment of the radial shaft seal according to the invention is shown in FIGS. 1, 2A, 2B, 2C, 3A, and 3B, and is designated by the numeral 100.

The shaft seal 100 includes an annular, L-shaped case 10, resilient sealing body 20 with an annular seal member 30 and a resinous ring 50. The case 10 has an axial flange 12 and a radial flange 14. The radial flange 14 has a portion 16 which extends radially and axially away from the axial flange. A resilient sealing body 20 is attached to and bonded to both the radial flange 14 and the axial flange 12. The sealing body 20 has an inner portion 24 and an outer portion 26. The outer portion 26 forms a static outer seal 4 on the outer portion of the axial flange 12 when pressed into the bore of a housing (not shown). The static outer seal 4 may have a bead 29 to create a high line sealing pressure on the bore of the housing in order to prevent the migration of fluid between the static outer seal 4 and the inner surface of the bore in the housing. The sealing body 20 forms a composite body that includes an annular elastomeric seal member 30 on one surface of the annular resinous ring 50 as will be explained later on.

The annular seal member 30 optionally has a supplementary sealing lip 32 to serve as a dirt excluder or dust lip as is well known in the art. The supplemental sealing lip 32 extends radially and axially from the annular seal 30 which is attached to portion 16 of the case 10. The lip 32 sealingly engages the surface 5 of the radial shaft 6 to prevent the migration of dirt or dust along the shaft surface 5 of the radial shaft 6 past the lip 32.

A resinous ring 50, a semi-rigid polymer, is face bonded to the annular seal member 30 by conventional adhesives well known in the art. The resinous ring 50 as shown in FIG. 1 has a polygonal shape in cross-section. However, optionally, the cross-sectional shape of the ring 50 may be square, rectangular, triangular, elliptical, round, or any other cross-sectional shape that is suitable for practicing the invention. In the present embodiment, the polygonal shape has an outer surface 52, a first conical surface 53, a second conical surface 54 adjacent to the first conical surface 53 and a first radially extending side 55 and a second radially extending side 55' opposite the first radially extending side 55. The sides 55, 55', respectively, connect the outer surface 52 to the first conical surface 53 and the second conical surface 54. The first conical surface 53 and the first radially extending side 55 that is adjacent to the first conical surface 53 and the outer surface 52 are face bonded to the annular seal member 30 by a conventional adhesive. At the interface of the first conical surface 53 and the second conical surface 54 is an inner radial contact edge 56.

Adjacent to the contact edge 56, a portion of the first conical surface 53 has a layer 34 of elastomeric material which extends from the annular elastomeric member 30 to form a distal end portion 33. The layer 34 is between 0.1 and 0.5 mm thick. At the contact edge 56, the resinous ring 50 absorbs a major portion of the contact load against the shaft surface 5. The contact load is formed by the radially inwardly acting forces of the sealing body 20 pressing on the distal end portion 33. The resinous annular ring 50 does not deflect substantially when the pressure level is within the range of 0 to 0.2 MPa in the sealed region 7. The resinous ring 50 provides stiffness and absorbs a major portion of the contact load on the primary sealing lip 36 which is formed on the layer 34. At temperatures above room temperature, there is a reduction in Young's Modulus in the resinous ring 50 and this reduction in modulus reduces the radial contact force that the resinous ring 50 exerts on the shaft surface 5 of the radial shaft 6.

The primary sealing lip 36 is defined by one frusto-conical surface 40 and second frusto-conical surface 42 which meet to form a sealing edge 41. According to the terminology commonly used in the art, the one frusto-conical surface 40 facing the liquid sealed region 7 is referred to as the "oil side" surface and the second frusto-conical surface 42 facing the gaseous or air region 8 is referred to as the "air side" surface. The primary sealing lip 36 has a sealing edge 41 which is in interference fit over the shaft 6 as is conventional. The sealing edge 41 has a dynamic seal portion that is in fluid tight relation to the surface 5 of the shaft 6 that is used to pump any fluid that migrates along the shaft back into the sealed region 7. The sealing edge 41 is also slightly compressed to form a static seal band 38. After the initial wear-in period the contact edge 56 is in sealing contact with the surface 5 of the shaft 6. The contact edge 56 absorbs a major portion of the contact load against the shaft surface 5. The seal 100 may be used in both rotary shaft and reciprocating applications.

Figure 2A:
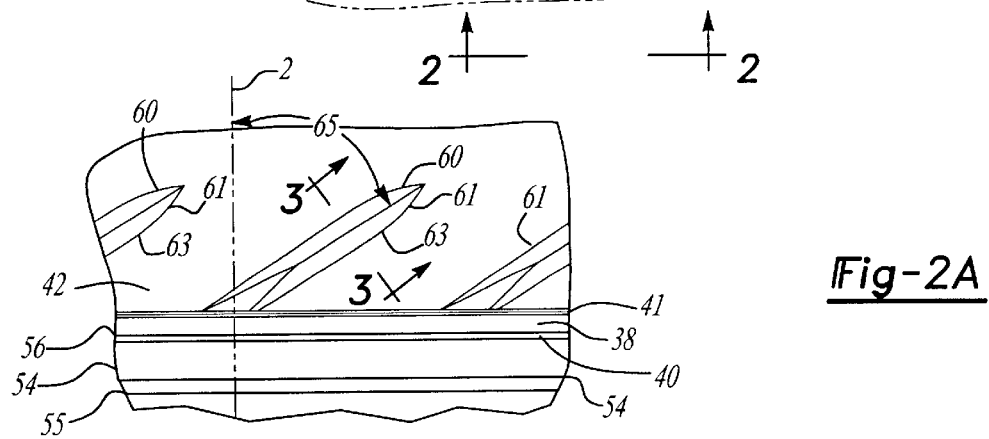
FIG. 2A is an enlarged fragmentary view of unidirectional helical rib taken generally in a plane indicated by the line 2—2 of FIG. 1.

The air side frusto-conical surface 42 may optionally be provided with a plurality of pumping members 60 which are circumferentially evenly spaced apart from each other along the second frusto-conical or air side surface 42 for radial rotating shaft seal applications as shown in FIG. 2A. One such plurality of pumping members 60 are unidirectional helical ribs 61, as is well known in the art. The helical ribs 61 are a series of pumping members 63 circumferentially evenly spaced apart from each other along the frusto-conical air side surface 42. Each of the unidirectional helical ribs 61 extends obliquely to the axis 2 of the shaft seal 100 at an equal helix angle 65. Other such pumping members 60 are bi-directional helical ribs 61a, 61a' respectively shown in FIG. 2B. As is well known in the art, one of the bi-directional helical ribs 61a includes a series of generally circumferentially spaced apart pumping elements 63a arranged so that a first portion of the pumping elements 63a are parallel to each other at an oblique angle 65a. The other of the bi-directional pumping ribs 61a' includes a second portion of the elements 63a' that are also parallel to each other but at an equal but opposed oblique angle 65a' at the edge 41 which is adjacent to the static seal band 38. Where the helical ribs 61a, 61a' respectively intersect the edge 41, the ribs 61a, 61a' respectively meet on a diameter which is equal to or only slightly greater than the inner diameter of the static seal band 38. As shown in FIG. 3B, the height 66 of each of the pumping unidirectional elements or ribs 61, or each of the bi-directional pumping ribs 61a, 61a' respectively varies between 0.05 to 0.35 mm.

Further optionally, the air side frusto-conical surface 42 may include other pumping members 60 such as radially undulating members 61b which are propagated along the inner surface parallel to the circumference such that the difference between the circumferentially adjacent maximal and minimal distances between the inner surface and the axis is less than 0.33 mm. Such undulating members 61b are well known in the prior art, for example, in U.S. Pat. No. 5,190,299, which is incorporated herein by reference. The radially inwardly oriented members 61b are tensioned against the surface 5 of the shaft 6 while the radially outwardly oriented members just come into contact with or remain slightly apart from the surface 5 of the shaft 6, the undulating inner surface generates an axial pumping action toward the sealed region 7. The inner surface undulates sinusoidally along the circumference. The different slopes along the sine curve 64 generate forwarding actions that differ in strength in different areas of the member 61b. The extent of the pumping action of the dynamic seal against the shaft surface 5 depends on the angle of the member 61b, the geometry of the inner surface, how far it is from the axis 2 of the shaft 6, the width of the member 61b and the angle between the member 61b and axis 2. The primary sealing lip 36 is in an interference fit over the shaft 6 so as to put a radial contact load on the shaft surface 5. The inner diameter of the sealing edge 41 is slightly compressed to form a static seal band 38.

Still further optionally, the pumping members 60 may also include, for example, a number of geometric shapes including trapezoidal, polygonal, triangular, partially elliptical, partially round, rectangular, square, or arcuate members. Each of these geometric shaped members can be further optionally modified with sinusoidal grooves on its surface as is well known in the prior art. The above examples are not to be taken as a limitation on the scope of the present invention but rather that the invention contemplates the use of any such geometric shapes or their equivalents as pumping members in practicing the invention.

The oil seal 100 may be made by molding of an elastomeric material and by trimming of the molded elastomeric member as will be discussed later on. Molding of the seal 100 may be carried out by a conventional injection molding process. Optionally, the inner core may be provided with a plurality of grooves designed and configured to mold the pumping ribs 61, 61a, 61a', respectively, or members 61b in the elastomeric member. Alternatively, a compression molding process or transfer molding process or a combination of the injection and compression process or the transfer and compression method may be used in molding seal 100.

In operation, the primary sealing lip 36 of the shaft seal 100 is installed in a housing and over the shaft 6 in a well known manner. The sealing lip 36 is in an interference fit over the shaft 6 so as to put a radial contact load on the shaft surface 5. The inner diameter of the sealing edge 41, which is slightly compressed, forms the static seal band 38. The inner or radial contact edge 56 and the sealing edge 41 operate against either a rotating or reciprocating shaft 6 on the air side 8 to sealingly engage the surface 5 and to prevent fluid migration from the oil side 7.

Figure 2B:
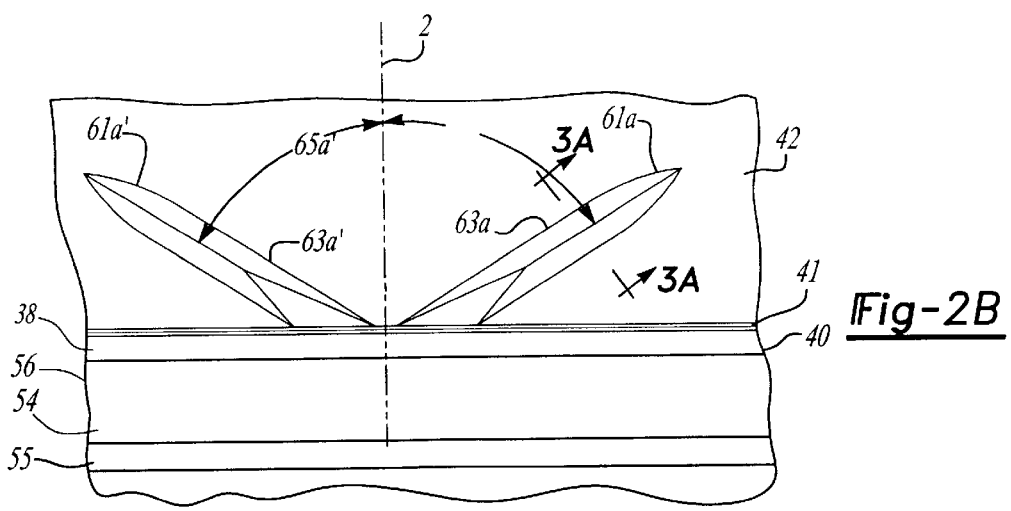
FIG. 2B is an enlarged fragmentary view taken generally of bi-directional helical ribs in a plane indicated by the line 2—2 of FIG. 1.

In radial shaft applications, where portions of the optional pumping members or elements 60 are unidirectional helical ribs 61, the ribs 61 contact the surface 5 of the shaft 6 to form a spine-like contact pattern that converges away from the sealed region 7. Where the optional pumping members 60 are bi-directional helical ribs 61a, 61a' respectively the members 60 pump any fluid that migrates along the shaft surface 5 back to the sealed region 7. The edges of the bi-directional ribs 61a, 61a', respectively, define spaces which form the sealing surface. Thus, where a portion of the elements 63a are oppositely disposed to elements 63a', regardless of the direction of rotation of the shaft 6 around which the seal 100 is assembled, one portion of the elements 63a or the other portion of the elements 63a' constitute pumping chambers to pump fluid leaking or migrating past the sealing surface or band 38 back toward the upstream or oil side 7. The pumping ribs 61a, preferably gradually fade out as shown and are disconnected or paced apart from adjacent pumping ribs 61a' as shown in FIG. 2B.

If the optionally pumping members 60 are undulating members 61b, the undulating inner surface generates an axial pumping action toward the sealed region 7. The pumping action generated by the seal moves the fluid along the surface 5 of the shaft 6 past the member 61b and back into the sealed region 7.

As stated earlier, the inner radial contact edge 56 of the resinous ring 50 contacts the shaft surface 5 so that the resinous ring 50 absorbs a major portion of the radial contact load of the primary sealing lip 36 on the shaft surface 5 after initial break-in. This reduces the radial load exerted by the sealing lip 36 on the shaft surface 5 to approximately half or less of the total radial contact load after initial wear-in. After the initial wear-in of the sealing lip 36 on the shaft 6, the contact edge 56 may increase somewhat in axial length or width along the shaft surface 5 and the sealing edge 41 may also increase somewhat in axial length or width along the shaft surface 5. However, at all times after initial wear-in, the radial or contact load is shared by both the primary sealing lip 36 and the resinous ring 50. The percentage of load may vary from the sealing edge 41 of the sealing lip 36 to the inner radial contact edge 56 of the resinous ring 50 from time to time such as with the level of pressure in the sealed region 7, the amount of lubrication at the sealing edge 41, the inner radial contact edge and other application variables. However, at least half of the radial reaction forces of the contact load, after initial wear-in or break-in, will be absorbed at all times by the contact edge 56 of the resinous ring 50. Because of this, the shaft seal 100 can operate effectively to seal the shaft 6 in a "dry" or low lubrication condition. The resinous ring 50 rides on the shaft surface 5 thereby reducing the radial contact load on the primary sealing lip 36 on the shaft surface 5 of the shaft 6 and extending the life of the seal lip 36. Thus, when there is little or no lubrication in the shaft, the primary sealing lip 36 may wear away initially but as it does, more of the radial contact load is shifted to the resinous ring 50 until a new radial contact load sharing relationship is established between the primary sealing lip 36 and the contact edge 56. This reduces the long term wear on the sealing edge 41. Any lubricant that migrates along the shaft surface 5 from the sealed region 7 is pumped back to the sealed region 7 by the pumping elements 60 as is conventional. The static seal band 38 on the primary sealing lip 36 prevents any migration of fluid from the sealed region 7 when the shaft 6 is at rest.

Those skilled in the art will recognize that the bi-directional helical ribs 61a, 61a' respectively and undulating members 61b work effectively in either a clockwise or counterclockwise direction of rotation of the shaft 6. The uni-directional helical ribs 61 work effectively in only one direction of rotation of the shaft 6.

The shaft seal 100 may also be employed in reciprocating applications of the shaft 6. In reciprocating applications, the optional pumping members 60 may be deleted and the operation of the seal 100 is the same as in rotating applications except that the shaft reciprocates in a back and forth motion against the primary sealing lip 36 and the contact edge 56 of the shaft seal 100.

Where the pressure in the sealed region 7 exceeds 0.2 MPa, it has been found to be advantageous to modify the design of the seal to provide additional structural support to the resinous ring and to modify the configuration of the pumping members which will now be described.

The second seal embodiment is directed to a radial shaft seal for sealing dynamic applications adapted for use in pressure ranges of up to 0.3 MPa. Where the elements are the same as in the first seal embodiment they are identified by the same numerals. The shaft seal of the second embodiment is designated by the numeral 200 and is shown in FIGS. 4, 5A, 5B, 6–8. The second shaft seal 200 includes an annular L-shaped case 110, a resilient sealing body 120 with an annular elastomeric seal member 130, and a resinous ring 150.

The case 110 has an axial flange 112 and a radial flange 114. The outside portion of the axial flange 112 and the side of the radial flange 114 that face the air side 8 are covered with the outer portion 126 of the sealing body 120. The inner portion 124 of the sealing body 120 covers a portion of the radial flange 114 facing the sealed region 7.

The resilient sealing body 120 forms a composite body that includes an annular seal member 130 on one surface of the annular resinous ring 150 as will be explained later on. The resilient body may optionally include the supplemental sealing lip 32 (not shown in FIG. 4).

The resinous ring 150 is a semi-rigid polymer which is face bonded to the resilient sealing body 120 by conventional bonding methods. The resinous ring 150 is shown as having a parallelogram cross-sectional shape, but optionally, it may be rectangular, square, polygonal, triangular, partially elliptical, partially round, arcuate, or any other cross-sectional shape suitable for practicing the invention. The resinous ring 150 has an outer portion 152, an inner portion 153, a first inner side 154 and a second inner side 155. The inner portion 153 connects the second inner side 155 to the first inner side 154. The outer portion 152 is connected to the first inner side 154 and the second inner side 155. The inner portion 153, a portion of the outer portion 152 and the first inner side 154 are face bonded to the resilient sealing body 120. The first inner side 154 is in a spaced apart but adjacent relationship to the radial flange 114.

An inner radial contact edge 156 is formed at the interface of the second inner side 155 and the inner portion 153. Adjacent to the contact edge 156, a portion of the inner portion 153 has a layer 134 of elastomeric material which extends from the annular elastomeric seal member 130 to its distal end portion 151. The layer 134 is 0.1 to 0.5 mm thick. The resinous ring 150 provides stiffness to the layer 134 and absorbs at least half of the contact load on the primary sealing lip 136 after initial break-in. The three sided face bonding and the proximity of the resinous ring 150 to the radial flange 114 reduces the tendency of the layer 134 to flex during operation.

The primary sealing lip 136 is defined by a pair of frusto-conical surfaces 140, 142 which meet to form a sealing edge 141. The primary sealing lip 136 has a first frusto-conical surface 140 which faces the sealed region 7 and another frusto-conical surface 142 which faces the air side 8. The frusto-conical surface 142 is optionally provided with pumping elements or members 160 such as a plurality of equally spaced unidirectional helix bars with pumping elements or ribs 161 along the frusto-conical air side 142, as shown in FIG. 5A. As shown in FIG. 5B, the elements 160 may optionally include a series of generally spaced apart, bi-directional helix bar pumping elements 161a, 161a', respectively, along the frusto-conical air side 142, arranged so that a first portion of the elements 161a are parallel to each other at an oblique angle 165 and a second portion of the elements 161a' are also parallel to each other but at an equal but oppositely disposed oblique angle 165a' toward the edge 41 adjacent to the static seal band 38. The elements 161a, 161a', respectively, are on a diameter equal or only slightly greater than the inner diameter of the static seal band 38. Each of the pumping elements 160 extends obliquely to the axis 2 of the seal 200.

Since the helix bar unidirectional pumping members 161 and the bi-directional helix bar elements 161a, 161a' respectively are identical, except as noted above, only the unidirectional pumping member 161 will be described. Each of the pumping members 161 is defined by a pair of opposite side faces 164 and 166 that mate with each other to form a working or oil scraping edge 168. Furthermore, each of the oil scraping edges 168 are configured so as to extend from point 176 to the sealing edge 141 and includes an axial section 172. The section 172 extends from an axially inner portion to an axially outer portion. The term "axially inner" or "axially inwardly" as used herein is intended to mean the direction toward the liquid sealed region 7 of the seal 200 and the term "axially outer" or "axially outwardly" the direction toward the air side 8.

The section 172 has a triangular cross-section throughout its length but has a varying cross-sectional dimension. The height of the section 172 progressively increases from the juncture 174 of the axially inner portion and the sealing edge 141. The section 172 culminates at the middle portion and thereafter gradually decreases to become zero at its outermost point 176.

In use, the outer portion of the seal 200 is press fit in a well-known manner within a housing (not shown). The sealing lip 136 of the seal 200 is an interference fit over a shaft 6 as is conventional. The inner diameter of the sealing edge 141 is slightly compressed to form a static seal band 38 on the shaft 6.

The portions of the optional pumping members 160 in contact with the shaft present a uniform contact pattern on the shaft 6 in radial shaft applications. Under dynamic operating conditions, that is where the shaft is rotated in one direction, the working or scraping edges 168 of the helical pumping members 161, 161a, 161a', respectively, in contact with the shaft surface 5 operate to scrape oil film and feed oil past the static seal band 38 back to the sealed region 7 by the hydrodynamic pumping action of the pumping members 160. After the initial stage of use, the oil seal 200 made according to the present invention, provides a satisfactory initial sealing performance under both static and dynamic operating conditions.

Under static conditions of the seal, the portion of the section 172 at the edge 141 which lies adjacent to the static seal band 38 is readily compressed and flattened against the shaft 6. As a consequence, a continuous static seal band 38 is formed along the entire circumference of the shaft 6 so as to develop a sufficient initial static seal performance. Under the dynamic operating conditions, each of those parts of the section 172 form a contact pattern that serves as the pumping blade to achieve the initial hydrodynamic pumping action.

As stated previously, the primary sealing lip 136 is defined by one frusto-conical surface 140 and another frusto-conical surface 142 which meet to form the sealing edge 141. The sealing edge 141 is in interference fit over the shaft 6 as is conventional. Another frusto-conical surface 142 with the pumping members 160 forms the dynamic seal portion that is in fluid tight relation to the surface 5 of the shaft 6. The members 160 pump any fluid that migrates along the shaft back into the sealed region 7. The sealing edge 141 is also slightly compressed to form a static seal band 38 and the contact edge 156 is contact with the surface 5 of the shaft 6 as stated previously. The contact edge 156 absorbs a major portion of the contact load against the shaft surface 5.

In all other aspects, the second seal 200 operates in the same manner as the seal 100 of the first seal embodiment.

Figure 9:
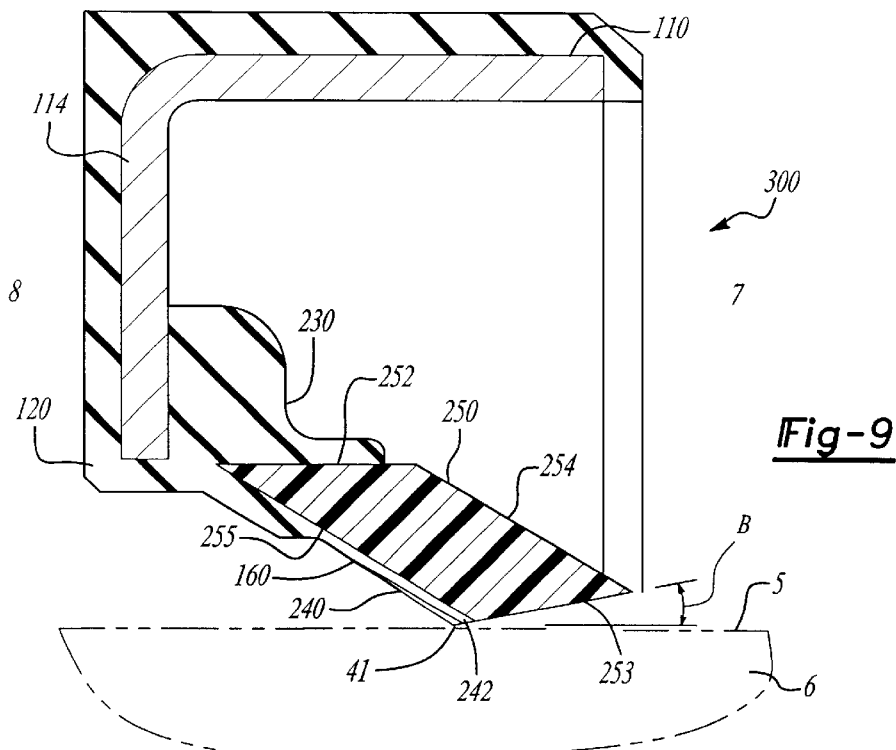
FIG. 9 is a cross-sectional view of still another embodiment of the shaft seal according to the present invention.

A third seal embodiment is shown in FIG. 9 and this third seal is designated by the numeral 300. The same elements are identified by the same numerals as disclosed in the second seal embodiment. The seal 300 is directed to a radial shaft seal for sealing dynamic applications and is adapted for pressures up to 0.1 MPa. The shaft seal 300 includes an annular L-shaped case 110, a resilient sealing body 120 with an annular seal member 230 and a resinous ring 250.

The resilient sealing body 120 forms a composite body that includes the annular seal member 230 on one surface of the resinous ring 200 as will be explained later on. The sealing body 120 may optionally include the supplemental sealing lip 32 (not shown). The annular seal member 230 has a layer 34 of elastomeric material.

The resinous ring 250 is face bonded to the annular seal member 230 by conventional methods. The resinous ring 250 is shown as a trapezoidal shape but optionally, it may be a parallelogram, polygonal, square, rectangular, triangular, partially elliptical, partially round, arcuate, or any other cross-sectional shape suitable for the application. The resinous ring 250 has an outer axial side 252, an inner radially and axially extending side 253, a radially and axially extending side 254 facing the sealed side 7 and an outer radially and axially extending side 255 facing the air side 8. The outer axial side 252 and inner radially and axially extending side 253 are connected together by side 254 and side 255. The outer axial side 252 and the side 255 are bonded to the annular seal member 230 by conventional bonding methods. The resinous ring has an edge 256 that is adjacent to the edge 241. The contact edge 256 is in contact with surface 5. The mount of face bonding of the ring 250 is reduced compared to the second embodiment and because this provides less support to the primary pumping embers 160, the seal 300 may radially flex more than seal 200 during operation.

The primary sealing lip 136 is formed on the frustoconical surface 240 and, optionally, the sealing lip may be configured with either using unidirectional helix bar pumping elements 161' or bi-directional helix bar pumping elements 161a, 161a' respectively or undulating members 61b, as dictated by the requirements of the application. A static seal band 38 is formed past the edge 241 toward the liquid side 7. The primary sealing lip 136 provides the dynamic and static sealing functions and the contact edge 256 absorbs a major portion of the contact load. In all other aspects, the third seal 300 operates in the same manner as the second seal 200.

Figure 10:
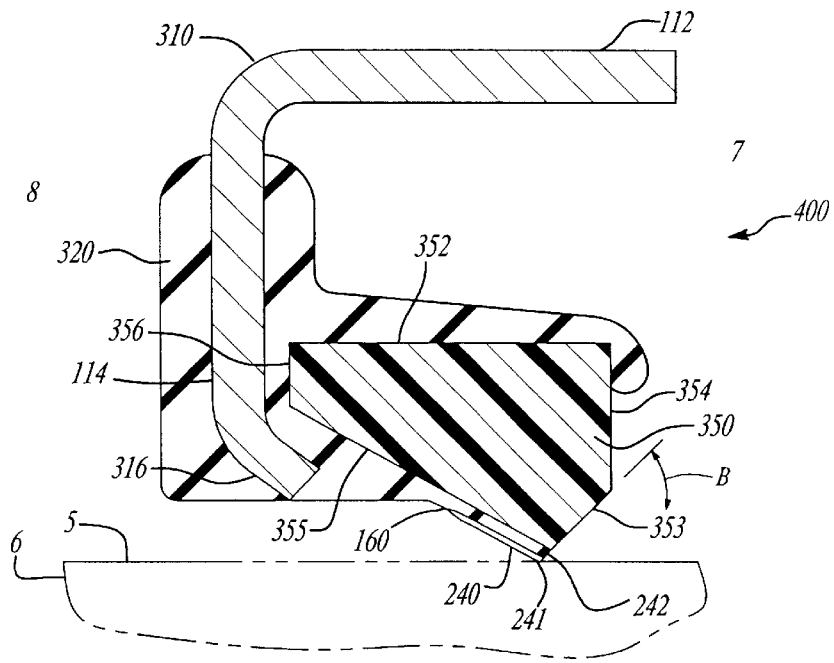
FIG. 10 is a cross-sectional view of yet another embodiment of the shaft seal according to the present invention.

In the fourth seal embodiment, as shown in FIG. 10, is designated by the numeral 400. The same elements are identified by the same numerals as disclosed in the third seal embodiment. The seal 400 is directed to a radial shaft seal for sealing dynamic applications and is adapted for pressures up to 0.5 MPa. The shaft seal 400 includes an annular L-shaped case 310, a resilient sealing body 320 with an annular seal member 330 and a resinous ring 350. The L-shaped case 310 has an axial portion 112 and a radial portion 114 with an axially and radially extending portion 316. In this embodiment, no static seal is provided on the axial portion 112.

The resilient sealing body 320 forms a composite body that includes the annular seal member 330 on one surface of the resinous ring 350 as will be explained later on. The resilient sealing body 320 may optionally include a supplemental lip 32 (not shown). The resilient sealing body 320 is bonded to the radial portion 114. The resinous ring 350 is face bonded by conventional means on four sides to the resilient sealing body 320. The resinous ring 350 has an outer axially extending side 352, an inner radially and axially extending side 353, an inner radial side 354, an air side radially and axially extending side 355 and an outer radial side 355a. Between the axially extending side 353 and side 355 is an edge 356. The resilient sealing body 320 is face bonded to sides 352, 355, 355a, respectively, and a portion of the side 354. The resilient sealing body 320 extends on both sides of the radial portion 114 and the extending portion 116 to reduce the ability of the resinous ring 350 to flex radially during operation. The annular seal member 330 and primary sealing lip 136 are formed on the frusto-conical surface 242. The annular seal member has a layer 34. The sealing lip 136 may optionally have either unidirectional helix bar pumping elements 161 or bi-directional helix bar pumping elements 161a, 161a' respectively or undulating members 61b, as required by the application. The primary sealing lip 136 provides the dynamic and static sealing functions and the contact edge 256 absorbs a major portion of the contact load. In all other aspects, the fourth seal 400 operates in the same manner as the second seal 200.

The process of molding the seal according to the present invention as shown in FIGS. 11A, 11B and 11C will now be described. Those skilled in the art will recognize that the process that will be described is applicable to each of the seals 100, 200, 300, 400, respectively.

Prior to molding, the case is first placed in position in the mold, then the resinous ring is placed in the mold and a quantity of uncured elastomeric material is then injected into the mold cavity in a well-known manner. The molded elastomeric material is subjected to curing conditions so that the elastomeric material is bonded to the case and the elastomeric material cross links to form a network of connected molecules to provide the elastomer its elastic properties. After cooling, the molded product is released from the mold to obtain a semi-finished oil seal 500 which represents various forms of seals 100, 200, 300, and 400. Optionally, the molded product is placed in a post-cure oven to form its elastic properties, as is also conventional.

Referring to FIG. 11A where the semi-finished oil seal 500 is shown prior to trimming. The elastomeric member as molded into a semi-finished oil seal 500 will be described relative to seal 100 and including a primary sealing lip forming portion 80 and an integral hat portion 9 that is connected to a sprue portion 3. On the inner wall of the lip portion 80 is a molded surface that is defined by the outer surface of the inner core of the mold cavity. The optional pumping elements 60, are molded on the lip forming portion 80 and lie on the frusto-conical surface 42 throughout the entire length. Alternatively, as shown in FIGS. 11B and 11C the elastomeric member is molded into a semi-finished oil seal 500, which will be discussed relative to seal 200 including the primary lip sealing portion 180 and an integral hat portion 9 connected to a sprue portion 3. The inner wall of the lip forming portion 180 is a molded surface that is defined by the outer surface of the inner core of the mold cavity. For both seals 100, 200, the optional pumping elements 60, 160, respectively, as molded, lie on the frusto-conical surfaces 42, 142, respectively.

The elastomeric layer 34, as molded, is then cut by a trimming knife of a conventional trimming machine (not shown) along a frusto-conical trim plane to form a sharp sealing edge 41, 141 defined by the one frusto-conical surface and the other frusto-conical surface. The trim line 88 is set by a trim angle B so that it intersects the edge of one of the pumping elements 60, or alternatively, the elements 160. The trim angle B will preferably vary between minus 10 degrees to plus 40 degrees relative to the axis 2 of shaft 6. Those skilled in the art will recognize that for low pressure applications, the pumping elements 60, 160, respectively, will wear relatively slowly compared to the wear of pumping elements 160 in medium to high pressure applications.

Figure 12A:
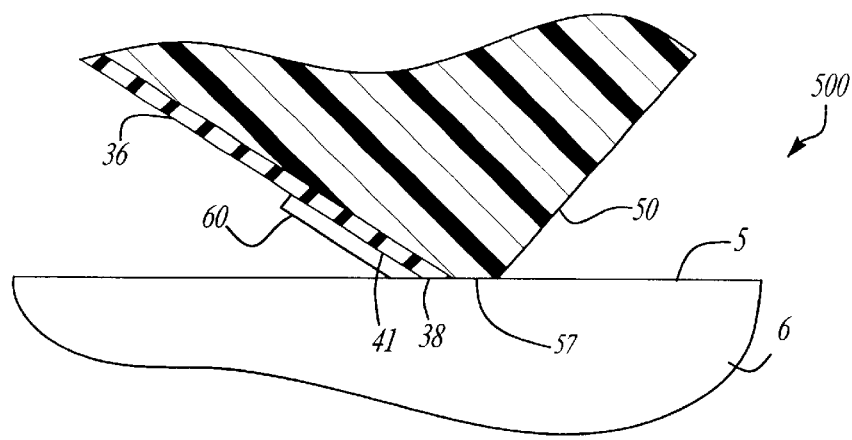
FIG. 12A is a cross-sectional view of FIG. 11A after initial wear-in of the seal according to the invention as installed on the shaft.

FIG. 12A shows the primary sealing lip 36 and resinous ring 50 after initial wear in of the helical ribs 61, 61a, 61a'. The width of the static seal band 38 will be expanded axially as shown and the contact edge will expand to a contact surface 57. The contact portion of each rib still has an adequate axial extent so that a satisfactory dynamic pumping action is provided. The wear in rib 61, 61a, 61a' is substantially reduced because contact load is shared with resinous ring 50. At all times the major portion of the contact load is carried by the contact surface 57.

Figure 12B:
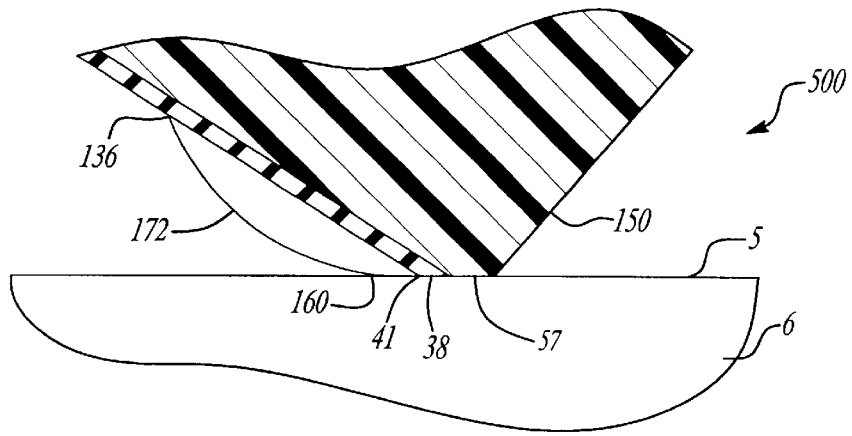
FIG. 12B is a cross-sectional view of FIG. 11B after initial wear-in of the seal as installed on the shaft.

As shown in FIG. 12B, after the primary sealing lip 136 and the bi-directional helical pumping ribs 161a, 161a', respectively, have undergone some initial wear, the width of the static seal band 38 will be expanded axially as shown and the contact edge will expand to a contact surface 57. The spine-like contact pattern is formed solely by section 172. As the contact surface 57 now lies in a plane that obliquely traverses the region of the section 172 having an increased cross-section, the contact pattern, after wear-in still has an adequate axial extent so that a satisfactory dynamic pumping action is provided. The wear in section 172 of the helix bar 160 is substantially reduced because the contact load is shared with the resinous ring 150. At all times the major portion of the contact load is carried by the contact surface 57.

Figure 12C:
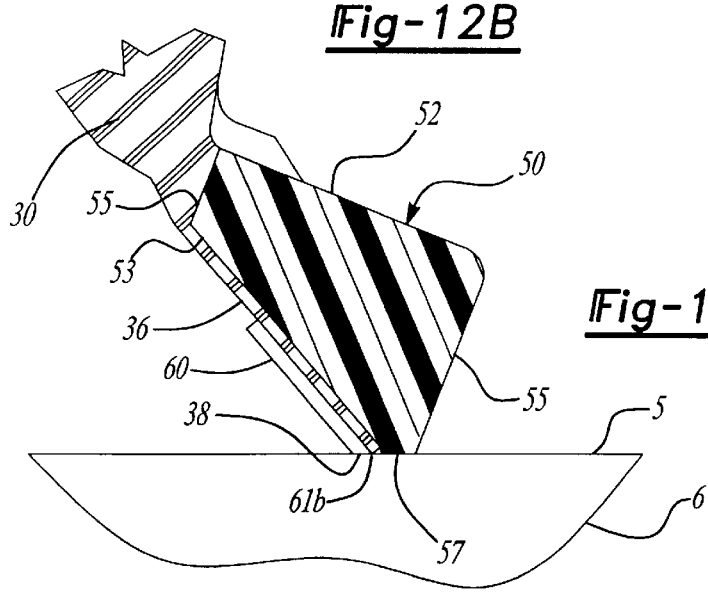
FIG. 12C is a cross-sectional view of FIG. 11C after initial wear-in of the seal as on the shaft.

As shown in FIG. 12C, where the undulating members 61b provide a dynamic pumping action and a static sealing function, the contact surface 57 of the resinous ring 50 carries a major portion of the contact load on the surface 5 of the shaft 6. After initial wear in, the axial length or width of the contact surface 57 may increase and the contact load may shift somewhat between the pumping elements 60, 160, respectively, and the contact surface 57 but at all times a major portion of the contact load is carried by the contact surface 57.

While the invention has been described in connection with several embodiments, it will be understood that it is not intended to limit the invention to these embodiments only. On the contrary, the description is intended to cover all alternative modifications and equivalents that may be included within the spirit and scope of the invention as defined by the appended claims.

What is claimed is:

1. A radial shaft seal adapted for sealing a dynamic shaft, said radial shaft seal comprising:
   a case member; and
   a sealing body attached to the case member, the sealing body including a seal member and a resinous ring;
   the resinous ring including a first conical surface, a second conical surface, and a radial contact edge formed at the interface of the first and second conical surfaces, and with the resinous ring having radial thicknesses along the first conical surface;
   the seal member including a layer of elastomeric material that is radially inward of and supported by the first conical surface of the resinous ring that forms a sealing lip having a first frusto-conical surface and a second frusto-conical surface that meet to form a sealing edge that is axially adjacent to the radial contact edge, and with the layer of elastomeric material having a radial thickness that is less than the radial thicknesses of the resinous ring along the first conical surface.

2. The shaft seal specified in claim 1 wherein the sealing edge is compressed against a shaft to form a seal band.

3. The shaft seal specified in claim 1 wherein the contact edge wears to form a contact surface.

4. The shaft seal specified in claim 1 wherein the sealing lip includes a plurality of pumping members.

5. The shaft seal specified in claim 4 wherein the pumping members are selected from a group consisting of uni-directional helical ribs, bi-directional helical ribs, uni-directional keel-shaped helical ribs, bi-directional keel-shaped helical ribs, and undulating pumping members.

6. The shaft seal specified in claim 4 wherein each pumping member includes a pair of opposite side faces that mate with each other to form an oil scraping edge.

7. The shaft seal specified in claim 6 wherein the oil scraping edge has a height that varies.

* * * * *